US012810118B2

(12) United States Patent
Holm et al.

(10) Patent No.: US 12,810,118 B2
(45) Date of Patent: Nov. 24, 2026

(54) SYSTEM, DEVICES AND/OR PROCESSES FOR ADAPTING NEURAL NETWORK TO EXECUTION HARDWARE

(71) Applicant: Arm Limited, Cambridge (GB)

(72) Inventors: Rune Holm, Oslo (NO); Anton Kachatkou, Papworth Everard (GB); Benjamin Klimczak, Galway (IE); Ruomei Yan, Cambridge (GB); Diego Russo, Cambridge (GB)

(73) Assignee: Arm Limited, Cambridge (GB)

( * ) Notice: Subject to any disclaimer, the term of this patent is extended or adjusted under 35 U.S.C. 154(b) by 524 days.

(21) Appl. No.: 18/458,800

(22) Filed: Aug. 30, 2023

(65) Prior Publication Data

US 2025/0077841 A1 Mar. 6, 2025

(51) Int. Cl.
*G06N 3/045* (2023.01)
*G06N 3/063* (2023.01)
*G06N 3/082* (2023.01)

(52) U.S. Cl.
CPC ............ *G06N 3/045* (2023.01); *G06N 3/063* (2013.01); *G06N 3/082* (2013.01)

(58) Field of Classification Search
CPC ......... G06N 3/045; G06N 3/063; G06N 3/082
USPC .......................................................... 706/28
See application file for complete search history.

(56) References Cited

U.S. PATENT DOCUMENTS

2023/0077258 A1* 3/2023 Shen ..................... G06N 3/082

OTHER PUBLICATIONS

Prasanna et al., "TensorRT 3: Faster TensorFlow Inference and Volta Support", https://developer.nvidia.com/blog/tensorrt-3-faster-tensorflow-inference/ , Dec. 4, 2017 (Year: 2017).*
Lankford, et al., "Open-source neural architecture search with ensemble and pre-trained networks", Internal Journal of Modeling and Optimization, vol. 11, No. 2, May 2021 (Year: 2021).*

* cited by examiner

*Primary Examiner* — Tsu-Chang Lee
(74) *Attorney, Agent, or Firm* — Berkeley Law & Technology Group, LLP

(57) ABSTRACT

Example methods, apparatuses, and/or articles of manufacture are disclosed that may be implemented, in whole or in part, using one or more computing devices to adapt a neural network structure to a target platform. One or more performance metrics of an execution of the neural network structure may be implemented by one or more target hardware elements. A module from a library of modules may be selected to replace one or more elements of the neural network structure based, at least in part, on the observed one or more performance metrics.

20 Claims, 6 Drawing Sheets

SYSTEM, DEVICES AND/OR PROCESSES FOR ADAPTING NEURAL NETWORK TO EXECUTION HARDWARE

BACKGROUND

1. Field

The present disclosure relates generally to systems, devices and/or processes for adapting a neural network to execution hardware.

2. Information

Neural networks have been deployed to implement machine-learning techniques for many applications such as, for example, image processing, computer vision, closed-loop system control, data analysis, just to provide a few example applications. Such neural networks have been implemented in a variety of different hardware environments including, for example, hardware environments based on particular central processing unit (CPU), neural processing unit (NPU) and/or graphics processing unit (GPU) architectures.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1A:
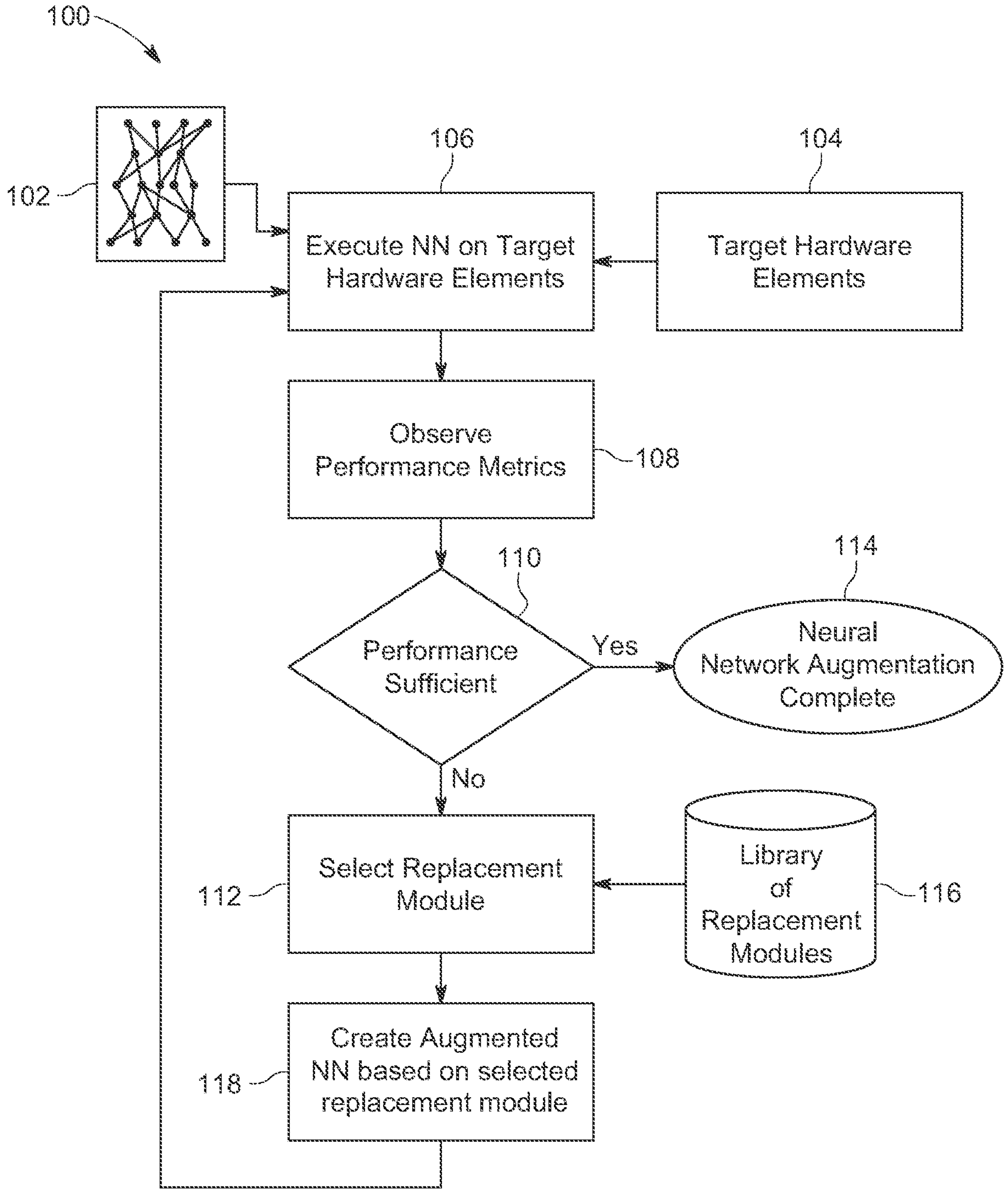
FIG. 1A is a flow diagram of a process to augment a neural network structure, according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, hardware elements to implement a particular neural network structure (e.g., for execution in an inference mode) may be selected to provide an optimized target platform. For example, based on a particular neural network structure, particular execution elements, memory, busses, etc. may be configured to meet certain requirements (e.g., power consumption, form factor) while minimizing execution latency. With the variety of different types of neural networks being deployed (e.g., convolution neural networks (CNNs), recurrent neural networks (RNN)) and different neural network applications (e.g., machine vision, data analysis, closed-loop control, etc.), custom design of hardware for different neural network deployments may be cost prohibitive.

According to an embodiment, aspects of a neural network structure may be modified and/or adapted to particular hardware elements of a target processing platform. In one implementation, a neural network structure may be executed by one or more target hardware elements while various performance metrics are observed. Such observed performance metrics may include, for example, memory usage and/or arithmetic logic unit (ALU) usage. Based, at least in part, on the observed performance metrics, one or more elements of the neural network structure may be modified and/or replaced based, at least in part, on one or more modules maintained in a library of modules. By adapting features of a neural network for improved execution on a target platform, optimal deployments may be achieved without costly custom hardware design.

In one implementation, a process for adapting a neural network structure to a target platform may be implemented in one or more tools for developing/optimizing a machine-learning system. For example, such tools may provide suggestions and/or advice to a developer for tailoring a neural network structure to a target platform based on a particular processor architecture (e.g., central processing unit (CPU), graphics processing unit (GPU) and/or neural processing unit (NPU)) and/or arithmetic logic unit (ALU).

To optimize a neural network structure for a given target platform, a developer may carry out multiple iterations of a process, while evaluating results and adjusting the neural network between iterations until a desired balance between the performance and accuracy is achieved. Some techniques may involve determining a list of candidate optimizations in advance, and then sequentially testing these candidate optimizations. However, this process may be tedious. In another technique, a process to optimize a neural network to a particular target platform may be automated to some degree.

In one approach to automating a process of optimizing a neural network structure, a balance between utility and simplicity may be achieved by constraining a scope of an automated process to local machine learning model architecture adjustments based on performance feedback. Such an automated process may also provide to an operator and/or user high-level controls over the automated process. Development tools to implement such an automated process may implement a close collaboration between providers of a target platform and machine learning model developers.

FIG. 1A is a flow diagram of a process 100 to augment a neural network structure, according to an embodiment. Neural network structure 102 may comprise a neural network structure designed to solve a particular problem using machine learning. In one example, neural network structure 102 may be developed and/or designed independently of a target platform (e.g., configuration of processors, memory, busses and compiler). Neural network 102 may be configured as any particular class of neural network including, for example, a convolutional neural network (CNN), a recurrent neural network (RNN), transformer neural network, just to provide a few examples of classes of neural networks. Design attributes of neural network structure 102 may be characterized, at least in part, by a number of layers, channel width at particular layers, operators assigned to nodes of particular layers, weight quantization, input quantization, class of neural network, just to provide a few examples of design attributes that make characterize a neural network configured to solve a particular problem using machine learning techniques. In one particular implementation, neural network structure 102 may be expressed, in whole or in part, as parameters stored in an electronic document (e.g., a computer-readable medium).

Target hardware elements 104 may comprise hardware building blocks used to implement execution of a neural network, such as execution of such a neural network in an inference mode. Target hardware elements 104 may define, for example, particular processor architectures (GPU, CPU, NPU), execution units (e.g., arithmetic logic unit (ALU) with an associated instruction set architecture) particular memory configuration, bus connectivity, compiler, just to provide a few examples of attributes which may characterize a target platform to execute neural network structure 102. In one embodiment, at block 106 neural network structure 102 may be executed according to target hardware elements 104. In one implementation, block 106 may execute neural network structure 102 on an actual target platform configured for execution of neural network structure 102 in an inference mode according to target hardware elements 104. In another embodiment, at block 106 execution of neural network structure 102 may be performed on a simulation and/or emulation of a target platform configured according to target hardware elements 104 rather than actual hardware components of a target platform configured for execution in an inference mode.

According to an embodiment, block 108 may observe one or more performance metrics during execution of neural network structure 102 at block 106. Metrics to be monitored at block 108 may include, for example, ALU usage, other functional unit usage, memory traffic, cache/SRAM traffic and/or cache/SRAM occupancy. In another implementation, such metrics to be monitored may include a cycle count as a frequency independent proxy to execution time. It should be understood, however, that these are merely examples of performance metrics that may be observed from the execution of a neural network on a target platform, and claimed subject matter is not limited in this respect. In a particular implementation, performance metrics observed at block 108 may be focused on a particular portion of neural network structure 102 such as, for example, a particular layer of neural network 102, particular nodes within a particular layer, interlayer communication between two particular layers of neural network structure 102, just to provide a few examples of particular portions of a neural network structure that may be observed at block 108.

According to an embodiment, particular goals or threshold levels of performance (e.g., as observed at block 108) may be established for execution of neural network 102. For example, such goals and/or thresholds may comprise a threshold level of ALU usage or memory traffic. If performance metrics observed at block 108 are not sufficient to satisfy such goals and/or thresholds as determined at diamond 110, a portion of neural network structure 102 may be replaced. Here, block 112 may select a replacement module from library of replacement modules 116. Such a replacement module selected at block 112 may include replacement of a portion/aspect of neural network structure 102 determined to significantly contribute to insufficient performance determined that diamond 110. Here, block 112 may select from library replacement modules 116 to specify a modification to and/or replacement of one or more operationally equivalent elements of the portion of neural network structure 102 determined to significantly contribute to insufficient performance.

According to an embodiment, block 118 may create a modified neural network structure based upon neural network structure 102. Here, block 118 may integrate one or more modules selected at block 112 into neural network structure 102 to create a modified neural network structure. Block 106, block 108 and diamond 110 may then be repeated based, at least in part, on a modified neural network created at block 118. If diamond 110 determines that performance metrics for the modified neural network observed at block 108 meets performance thresholds and/or goals, modification of neural network 102 by block 118 may be determined to be complete in the current iteration at 114.

According to an embodiment, a hardware implementation of a layer of neural network structure 102 and/or modifications thereof may be bound according to one or more constrained hardware resources. For example, such constrained hardware resource may comprise an execution unit usage attribute (e.g., ALU usage attribute) and/or a memory usage attribute. In an implementation, block 112 may select a module from library of modules to replace a portion of the layer of the neural network structure and/or modifications thereof such that the selected module reduces a usage and/or load on the one or more constrained hardware resources.

According to an embodiment, process 100 may comprise an automated process that receives operator or user inputs via a user interface. Also, process 100 may endeavor to optimize neural network structure 102 according to multiple objectives including, for example, execution latency, memory footprint and or usage, and accuracy/performance. Here, a user may specify an optimization target (e.g., execution latency, memory usage and/or performance accuracy), and then initiate an automated process to iteratively modify neural network structure 102 until performance metrics are sufficient to provide a final modified neural network structure at 114.

In iterations of process 100, block 108 may execute one or more performance analyzers (e.g., a neural graph compiler such as Vela, static analysis, execution on target hardware while capturing performance counters, etc.) to obtain granular performance metrics observable from Neural network structure 102. Block 108 may identify hotspots and/or opportunities for improvement of neural network structure 102 and/or modifications thereof, and track such hotspots back to particular elements (e.g., layers) in neural network structure 102 and/or modifications thereof.

According to an embodiment, for a particular hotspot and/or performance improvement opportunity identified by block 108, block 112 may be capable of selecting any one of multiple different modules from library 116. In an iteration of process 100, for multiple available modules selectable from library 116 to address such a particular hotspot and/or performance improvement opportunity, block 112 may prioritize the multiple modules based, at least in part, on expected impacts at addressing the particular hotspot and/or performance improvement opportunity. In an iteration of process 100, performance of modules in library 116 may be ranked according to gains that have been achieved in addressing the particular hotspot and/or performance improvement opportunity in previous iterations. Additionally, modules in library 116 may be calibrated and/or retrained to improve expected gains in subsequent iterations.

One such hotspot and/or performance opportunity may comprise a performance bottleneck among multiple performance bottlenecks in neural network structure 102 and/or modifications thereof. Block 112 may implement an ordering of such multiple performance bottlenecks and corresponding replacement candidates to determine a sequence of the performance bottlenecks are to be handled on iterations of process 100. Such an ordering of performance bottlenecks may be determined according to relative impacts on the performance of neural network 102 and/or modifications thereof. In one example, multiple performance bottlenecks of neural network 102 and/or modifications thereof may occur at multiple different associated layers making up neural network 102 and/or modifications thereof. Here, in selecting a module from the library of modules from library 116 to replace one or more elements to address a performance bottleneck among multiple performance metric, block 112 may sort the associated layers according to at least one performance cost metric. Block 112 may then prioritize replacement of an element at particular sorted layers according to relative contributions to the at least one cost metric.

On iterations of process 100, results of application of particular modules in library 116 (e.g., improvement in metrics observable at block 108) may be displayed to a user and/or operator through a computer user interface. For example, such applied modules may be displayed in a rank order based on a relative effectiveness in improving metrics observable at block 108. The computer user interface may display particular modules in library of modules 116 which were applied at block 112 to particular portions of neural network structure 102 and/or modifications thereof on completed iterations of process 100. Also, using the computer user interface, the user and/or operator may provide inputs to further guide subsequent iterations of process 100 by, for example, prioritizing certain observable metrics (e.g., accuracy/performance) and/or setting constraints. The computer user interface may then receive additional inputs from the user and or operator two, for example, prioritize performance metrics.

Figure 1B:
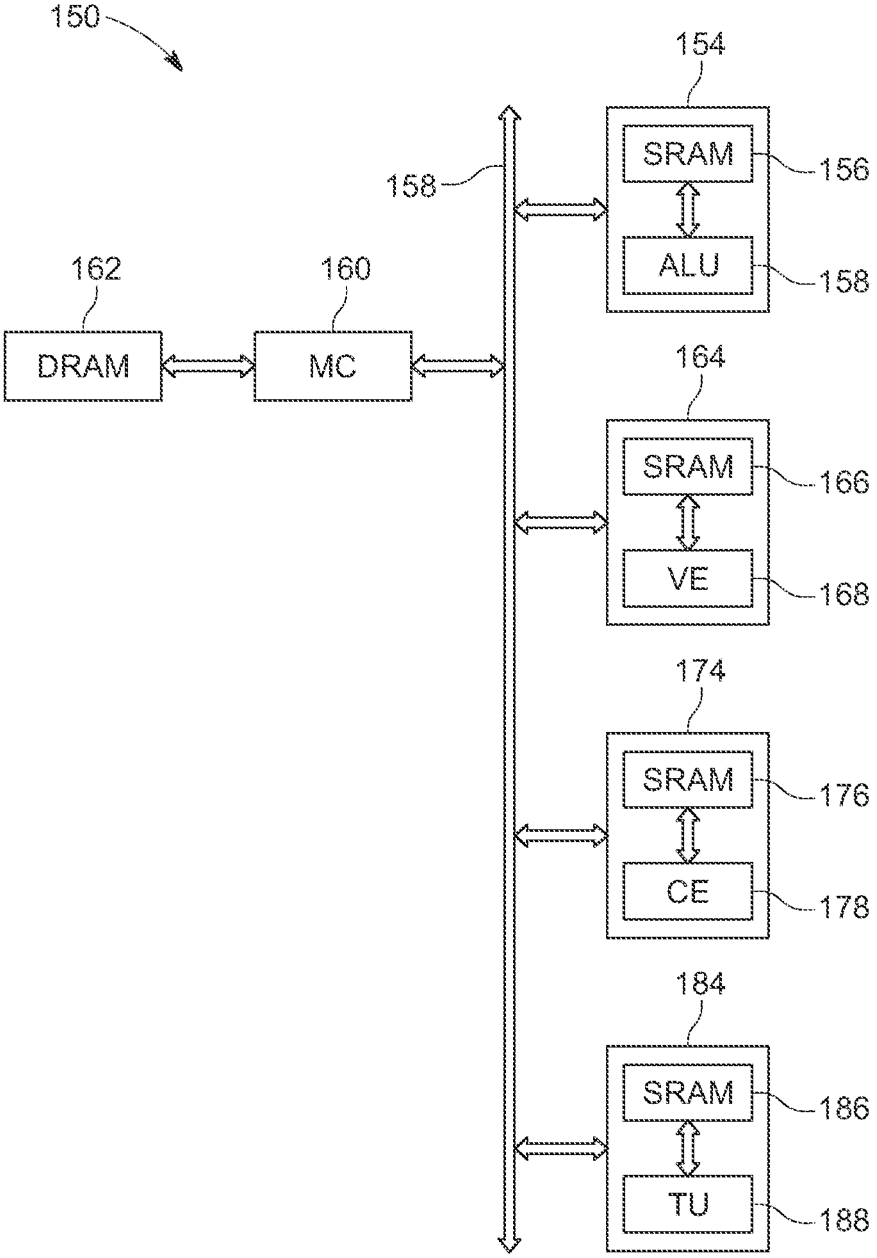
FIG. 1B is a schematic diagram of hardware elements that may be configured to at least in part implement a target platform for implementing a neural network structure, according to an embodiment.

FIG. 1B is a schematic diagram of hardware elements 150 that may be configured to at least in part provide a target platform for implementing/executing a neural network structure, according to an embodiment. For example, hardware elements 150 may be used in part for hardware elements 104 (FIG. 1A) for execution of neural network structure 102 and/or modifications thereof. According to an embodiment, execution units 154, 164, 174 and/or 184 may be implemented to execute operators of multiple nodes within a layer of a neural network and/or operators of nodes across multiple layers in the neural network. Parameters for execution of operators may be stored in dynamic random access memory (DRAM) 162 and transferred to static random access memory (SRAM) devices local to execution units 154, 164, 174 and/or 184 using one or more memory operations. For example, DRAM 162 may store weights (e.g., trained in machine-learning operations) to be applied by operators (e.g., defined by neural network structure 102 and/or modifications thereof), input tensors and/or intermediate feature maps.

As shown, execution units 154, 164, 174 and 184 are coupled to a dynamic random access memory 162 via a bus 158. While execution 154 may be implemented with an arithmetic logic unit (ALU) 158, other execution units 164, 174 and 184 may be configured and/or optimized for more specialized operations. For example, execution unit 164 may comprise a vector engine (VE) 168 optimized for array operations, execution unit 174 may comprise a convolution engine (CE) 178 configured and/or optimized for convolution operations and execution unit 184 may comprise a transformation unit (TU) configured and/or optimized for operations to manipulate arrays. It should be understood, however, that execution units 154, 164, 174 and 184 are merely examples of execution units that may be provided in a target platform for implementing a neural network, and claimed subject matter is not limited in this respect.

Execution units 154, 164, 174 and 184 may also each be configured with a local SRAM device such as SRAMs 156, 166, 176 and 186 as shown. For simplicity, FIG. 1B shows each of the execution units 154, 164, 174 and 184 are coupled directly to a main bus 158 for communication with DRAM 162. In particular implementations, additional local busses and/or data connections (not shown) may enable communication between and/or among Execution units 154, 164, 174 and 184 without access to main bus 158.

In a particular implementation, portions of SRAMs 156, 166, 176 and/or 186 may be configured to function as one or more levels of cache memory. According to an embodiment, microcode instructions and/or associated operands may be loaded to and/or stored in SRAMs 156, 166, 176 and/or 186 on execution cycles to be processed (e.g., by ALU 158, VE 168, CE 178 or TU 188). According to an embodiment, operators may be executed in whole or in part at execution units 154, 164, 174 and/or 184.

In a particular implementation, DRAM 162 and memory controller 160 may support execution of operators by multiple execution units (e.g., configured according to execution unit 154, 164, 174 and/or 184)). As such, memory controller 160 may facilitate memory traffic between DRAM 162 and multiple execution units to execute respective operators on the same execution cycles. According to an embodiment, memory controller 162 may execute direct memory access (DMA) transactions to efficiently load parameters to SRAM devices (e.g., SRAMs 156, 166, 176 and/or 186) local to execution units 154, 164, 174 and 184 from DRAM 162, and to write execution results back to DRAM 162. In an implementation, weights stored in DRAM 162 may be formatted as weight tensors such that weights to be applied in the execution of operators by multiple execution units in an execution cycle. Such weight tensors may be retrieved from DRAM 162 in a single DMA transaction (e.g., scatter transaction). Input values and/or portions of a feature map to be processed by multiple execution units in an execution cycle may also be retrieved from DRAM 162 in a single DMA transaction. Different DMA transactions may likewise be formatted as tensors to be retrieved from DRAM 162 in a single DMA transaction. Additionally, results computed by multiple execution units in the same execution cycle may be stored as a tensor in DRAM 162 from a single DMA transaction (e.g., gather transaction). In one implementation, one metric observed by block 108 may include a level and/or volume of memory traffic on bus 158 resulting from loading weight tensors, portions of feature maps and/or input tensors from DRAM 162, and/or a level and/or volume of memory traffic on bus 158 from storage of output tensors, computation results and/or portions of feature maps to DRAM 162.

According to an embodiment, hardware elements 150 may be implemented to execute a neural network structure at block 106. In another embodiment, aspects of hardware elements may be incorporated in an emulation and/or simulation of target hardware elements to execute a neural network at block 106. Additionally, aspects of hardware elements 150 may be observed at block 108 to determine observed performance metrics. Such performance metrics may include, for example, latency for execution of an operator, memory traffic on bus 158 loading of weights from DRAM 162 to SRAM 156, 166, 176 and/or 186, portion of memory traffic due to loading of weights, portion of memory traffic due to loading or storing feature maps, usage of ALU 158, VE 168, CE 178 and/or TU 188, an operation's footprint on or usage of SRAM, just to provide a few examples of performance metrics that may be observed from execution of an aspect of a neural network on hardware elements 150. In some implementations, such performance metrics may be extracted from performance counters of actual hardware, from model simulations or from fast approximate models, just to provide a few examples.

According to an embodiment, a compiler may be configured to implement any one of several different source operations (e.g., source operation defined by neural network structure 102 and/or modifications thereof) using hardware elements such as hardware elements 150 shown in FIG. 1B. Such source operations may include, for example, convolution operations, array arithmetic operations and/or array manipulation operations, just to provide a few examples. In a particular implementation, metrics observed at block 108 may be focused on behavior of particular target hardware elements 104 in executing one or more of these compiler-implemented source operations. To observe such metrics relating to a source operation, block 108 may identify execution passes mapped to the source operations. To estimate an execution latency of the source operation, for example, execution cycles for the identified execution passes may be combined (e.g., summed).

In an implementation, block 108 may identify execution passes mapped to a matrix operation, convolution and/or vector operation of the one or more hardware elements. For at least one of the execution passes, block 108 may obtain a count of execution cycles for the matrix operation, convolution and/or vector operation, and compare the count of execution cycles with a total number of cycles for the execution of neural network structure 102 and/or modifications thereof. Based, at least in part, on such a comparison of the count of execution cycles with a total number of cycles for the execution of the neural network structure, block 112 may select a module from library of modules 116 to reduce execution cycles of the convolution operation, matrix operation and/or vector operation.

In another implementation, block 108 may identify execution passes of one or more hardware elements mapped to a source operation of a neural network structure and, for at least one of the execution passes, compare a number of cycles to transfer a quantity of content with a total number of execution cycles for the source operation, and quantify traffic cycles of the number of traffic cycles as being associated with weights for an operator. Based, at least in part, on these quantification of traffic cycles associated with operator weights, block 112 may select a module from library of modules 116 so as to reduce traffic cycles associated with operator weights.

In another implementation, block 108 may identify execution passes of the one or more hardware elements mapped to a source operation of a neural network structure and identify compiled tensors mapped to a source tensor of the one or more hardware elements. Block 108 may, for at least one of the compiled tensors, determine whether the at least one of the compiled tensors is active during a maximum and/or approximately maximum memory footprint condition. Based, at least in part, on whether the at least one of the compiled tensors is active during such a maximum and/or approximately maximum memory footprint condition (and on a quantification of traffic cycles associated with particular parameters such as operator weights, operator inputs or feature maps, etc.), block 112 may select a module from library of modules 116 so as to reduce memory usage while the at least one of the compiled tensors is active.

According to an embodiment, performance metrics observed at block 108 may be isolated to a single layer of neural network structure 102 and/or modifications thereof. Likewise, replacement modules selected at block 112 may be directed to addressing performance of such a single layer of neural network structure 102 and/or modifications thereof. In one aspect, observable performance of a single layer of network structure 102 and/or modifications thereof may be addressed by affecting properties of trained weights to be applied at operators defined in the single layer. Such properties of trained weights may include, for example, sparsity, clustering and/or quantization. Table 1 below identifies example optimizations that may be achieved from selection of a replacement module at block 112 to address performance metrics of a single layer in an execution of neural network 102 and/or modifications thereof.

TABLE 1

| Optimization | Reduces Execution Latency for CE dominant pass | Reduces memory traffic for operator weights |
|---|---|---|
| Increase unstructured sparsity in weights | | X |
| Clustering/induce few unique values in weights | | X |
| Induce 2:4 structured sparsity in weights | X | X |
| Induce VSQuant-like weight representation | X | X |
| Reduce weight bit precision | X | X |

In an embodiment, "Increase unstructured sparsity in weights" may comprise an increase in sparsity in weights (e.g., increasing a number of weights with a zero value) without regard to structure in a weight tensor. "Clustering/induce few unique values in weights" may implement and/or affect a clustering of weights around a set discrete number of unique weight values. "Induce 2:4 structured sparsity in weights" may comprise an increase in sparsity in weights subject to constraints on a particular pattern in a weight tensor such as, for example, having no more than two non-zero weight values for any contiguous four weight values. "Induce VSQuant-like weight representation" may comprise implementing a vector-scale quantization to weight values in a weight tensor.

As shown in Table 1, the listed optimizations may tend to lower or reduce weight bandwidth (e.g., reduced memory traffic due to loading weights from DRAM 162 to SRAM 156, 166, 176 and/or 186). Thus, in an implementation, if metrics observed at block 108 indicate high memory traffic due to loading of weights, one or more of these optimizations may be selected. Optimizations directed to inducing weight sparsity and/or reduce weight precision (e.g., Induce 2:4 structured sparsity in weights, Induce VSQuant-like weight representation and Reduce weight bit precision) may also tend to reduce execution latency. Thus, in an implementation, if metrics observed at block 108 indicate an unacceptably high execution latency, block 112 may select one or more of Induce 2:4 structured sparsity in weights, Induce VSQuant-like weight representation and Reduce weight bit precision.

According to an embodiment, performance metrics observed at block 108 may be directed to interaction between and/or among layers (e.g., adjacent intermediate layers) of neural network structure 102 and/or modifications thereof. Likewise, replacement modules selected at block 112 may be directed to addressing performance relating to such interaction between and/or among layers of neural network structure 102 and/or modifications thereof. Table 2 below identifies example optimizations that may be achieved from selection of a replacement model at block 112 to address performance metrics relating to interaction between layers in an execution of neural network 102 and/or modifications thereof.

TABLE 2

| Optimization | Reduces Execution Latency for CE dominant passed | Reduces Execution Latency for VE/TU dominant passes | Reduces memory traffic for operator weights | Reduces tensor DRAM bandwidth/ intermediate SRAM footprint |
|---|---|---|---|---|
| Retrain pairs of convolutions to reduce number of channels in an intermediate tensor connecting the pairs of convolutions | X | | X | X |
| Reduce intermediate tensor bit precision | X | X | | X |
| Retrain away skip connections | | X | | X |
| Retrain away batch normalization left in a neural network following attempt to fold into a convolution | | X | | |
| Simplify layer normalizations | | X | | X |
| Simplify complex activation functions | | X | | |

TABLE 2-continued

As shown in Table 2, block 112 may select a replacement module directed to retraining pairs of convolutions to reduce a number of channels in an intermediate tensor connecting the pairs of convolutions if block 108 observes a high execution latency for a CE dominant operation, high memory traffic for weights and/or high tensor DRAM bandwidth and/or high intermediate SRAM footprint. Similarly as shown in Table 2, block 112 may select a replacement module directed to a reduction in intermediate tensor bit precision if block 108 observes high execution latency for a CE dominant operation, high execution latency for a VE/TU dominant operation, and/or high tensor DRAM bandwidth and/or high intermediate SRAM footprint.

In initial operations to train weights of neural network structure 102, according to an embodiment, neural network structure 102 may be implemented with skip connections to bypass layers certain layers. While such skip connections may remain in neural network structure 102 following such initial training operations, such remaining skip connections may contribute to execution latencies and/or memory usage. Thus, as shown in Table 2, block 112 may select a replacement module directed to retraining away skip connections to, for example, reduce an impact of such skip connections on execution latency and/or memory usage. Block 112 may select such a module from library of modules 116 directed to retraining away skip connections if block 108 observes high execution latency for a VE/TU dominant operation, and/or high tensor DRAM bandwidth and/or high intermediate SRAM footprint, for example. Similarly as shown in Table 2, block 112 may select a replacement module from library of modules 116 directed to retrain away of batch normalization remaining in a neural network following an attempt to fold into a convolution if block 108 observes high execution latency for a VE/TU dominant operation. Similarly as shown in Table 2, block 112 may select a replacement module from library of modules 116 directed to a simplification of layer normalizations if block 108 observes high execution latency for a VE/TU dominant operation, and/or high tensor DRAM bandwidth and/or high intermediate SRAM footprint. Similarly as shown in Table 2, block 112 may select a replacement module from library of modules 116 directed to a simplification of complex activation functions if block 108 observes high execution latency for a VE/TU dominant operation, for example.

Figure 2:
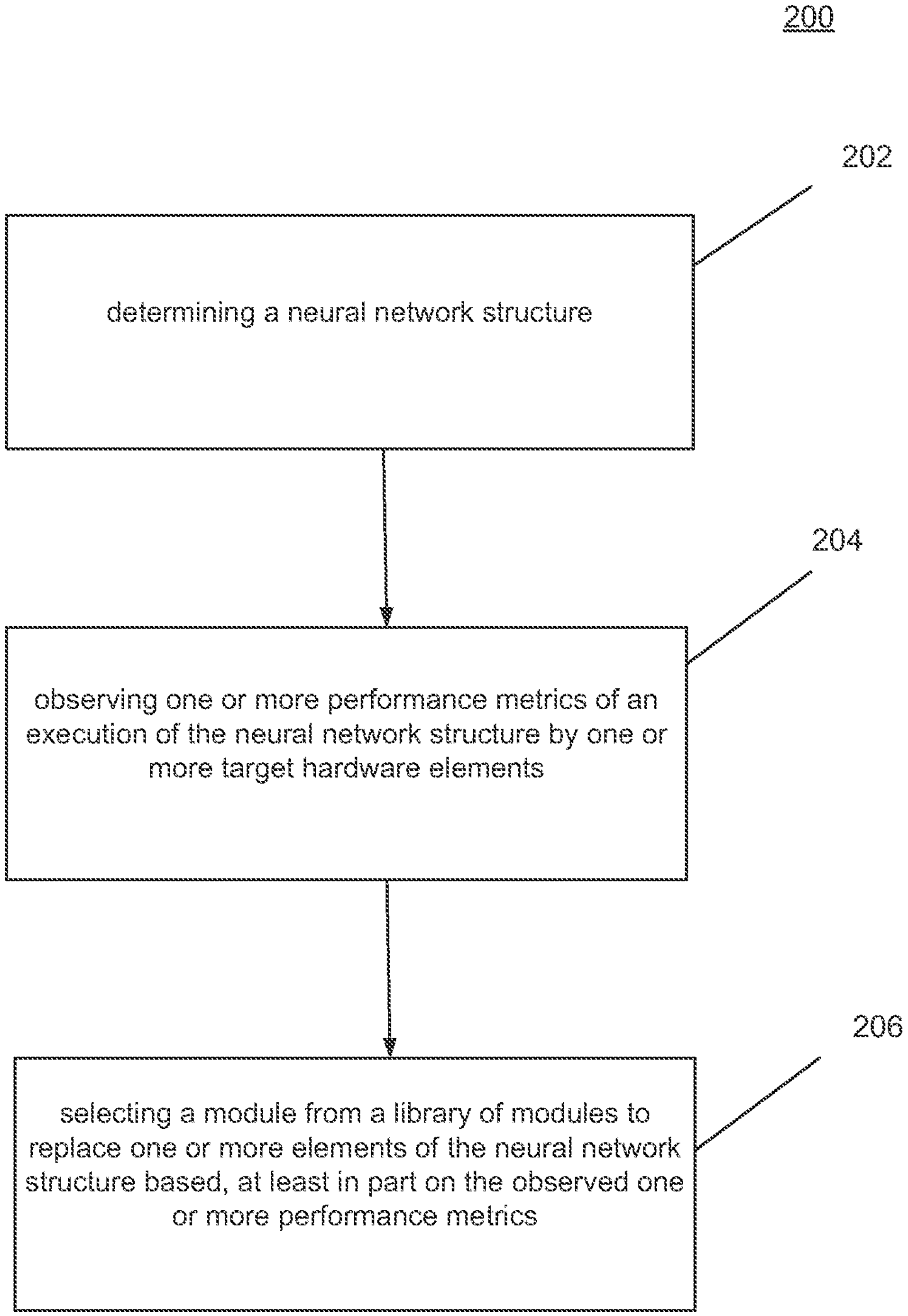
FIG. 2 is a flow diagram of a process to augment a neural network design according to an embodiment.

FIG. 2 is a flow diagram of a process 200 to modify a neural network structure, according to an embodiment. In one implementation, process 200 may adapt a neural network structure for implementation on a particular target platform, such as a target platform based, at least in part, on hardware elements 150, for example. Block 202 may comprise defining a neural network structure such as a neural network structure 102. As pointed out above, such a neural network structure defined at block 202 may comprise a neural network structure that is target platform agnostic. In other embodiments a neural network structure defined at block 102 may have been configured and/or optimized for a particular target platform.

Block 204 may comprise observing one or more performance metrics of an execution of the neural network structure defined at block 202 on one or more target hardware elements. Such one or more targeted hardware elements may comprise all or portions of target hardware elements 104 (FIG. 1A) and/or targeted hardware elements 150 shown in FIG. 1B. Block 204 may comprise observing one or more performance metrics according to block 108 (FIG. 1A). For example, block 204 may observe metrics such as, for example, execution latencies of particular hardware elements, memory usage, and or memory traffic, just to provide a few examples of performance metrics that may be monitored at block 204. Block 206 may comprise selecting a module from a library of modules (e.g., library of modules 116) to replace portions of the neural network structure defined at block 202. Such a selection of a module (such as library of replacement modules 116) may be performed by block 112 (FIG. 1A), for example. A particular a module selected at block 206 may comprise one or more particular optimizations shown in Tables 1 and 2, for example. A module selected at block 206 may be used to modify and/or augment the neural network structure determined at block 202. According to an embodiment, the module selected at block 206 to replace a portion of the neural network to determined at block 202 may improve to one or more performance metrics observed at block 204.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Figure 3:
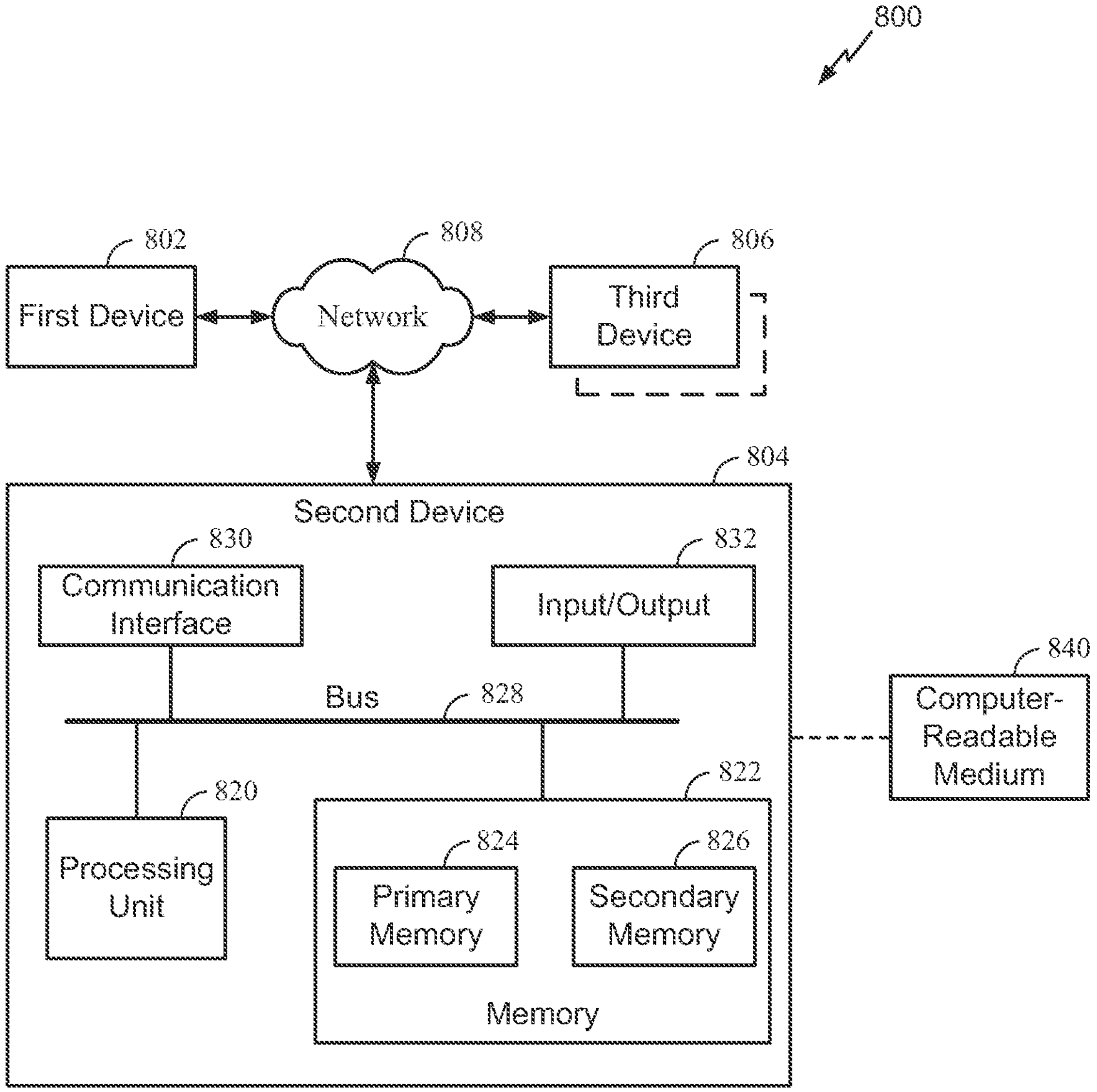
FIG. 3 is a schematic block diagram of an example computing system in accordance with an implementation.

In one example embodiment, as shown in FIG. 3, a system embodiment may comprise a local network (e.g., device 804 and medium 840) and/or another type of network, such as a computing and/or communications network. For purposes of illustration, therefore, FIG. 3 shows an embodiment 800 of a system that may be employed to implement either type or both types of networks. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices and/or one or more server computing device. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 3 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1A and 2, and in the text associated with the foregoing figure(s) of the present patent application.

Referring now to FIG. 3, in an embodiment, first and third devices 802 and 806 may be capable of rendering a graphical user interface (GUI) for a network device and/or a computing device, for example, so that a user-operator may engage in system use. Device 804 may potentially serve a similar function in this illustration. Likewise, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 828, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 804, as depicted in FIG. 3, is merely one example, and claimed subject matter is not limited in scope to this particular example. FIG. 3 may further comprise a communication interface 830 which may comprise circuitry and/or devices to facilitate transmission of messages between second device 804 and first device 802 and/or third device 806 in a physical transmission medium over network 808 using one or more network communication techniques identified herein, for example. In a particular implementation, communication interface 830 may comprise a transmitter device including devices and/or circuitry to modulate a physical signal in physical transmission medium according to a particular communication format based, at least in part, on a message that is intended for receipt by one or more recipient devices. Similarly, communication interface 830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global navigation satellite system (GNSS) receiver and/or other location-identifying type capability, and/or a display with a higher degree of functionality, such as a touch-sensitive color 5D or 3D display, for example.

In FIG. 3, computing device 802 may provide one or more sources of executable computer instructions in the form physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 3 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a computer-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 3, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 3 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

According to an embodiment, a neural network may comprise a graph comprising nodes to model neurons in a brain. In this context, a "neural network" as referred to herein means an architecture of a processing device defined and/or represented by a graph including operators (represented by nodes in the graph) to model neurons that process input signals to generate output signals, and tensors (represented by edges in the graph) connecting the operators to represent input and/or output signal paths between and/or among operators (represented by nodes the graph). In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented by one or more computing devices such as computing devices including a central processing unit (CPU), graphics processing unit (GPU), digital signal processing (DSP) unit and/or neural processing unit (NPU), just to provide a few examples. In a particular implementation, neural network weights and/or numerical coefficients associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a neural network weight to input signals, and sum weighted input signals to generate a linear combination.

According to an embodiment, edges in a neural network connecting nodes may model synapses capable of transmitting signals (e.g., represented by real number values) between neurons. Responsive to receipt of such a signal, a node/neural may perform some computation to generate an output signal (e.g., to be provided to another node in the neural network connected by an edge). Such an output signal may be based, at least in part, on one or more weights and/or numerical coefficients associated with the node and/or edges providing the output signal. For example, such a weight may increase or decrease a strength of an output signal. In a particular implementation, such weights and/or numerical coefficients may be adjusted and/or updated as a machine learning process progresses. In an implementation, transmission of an output signal from a node in a neural network may be inhibited if a strength of the output signal does not exceed a threshold value.

Figure 4:
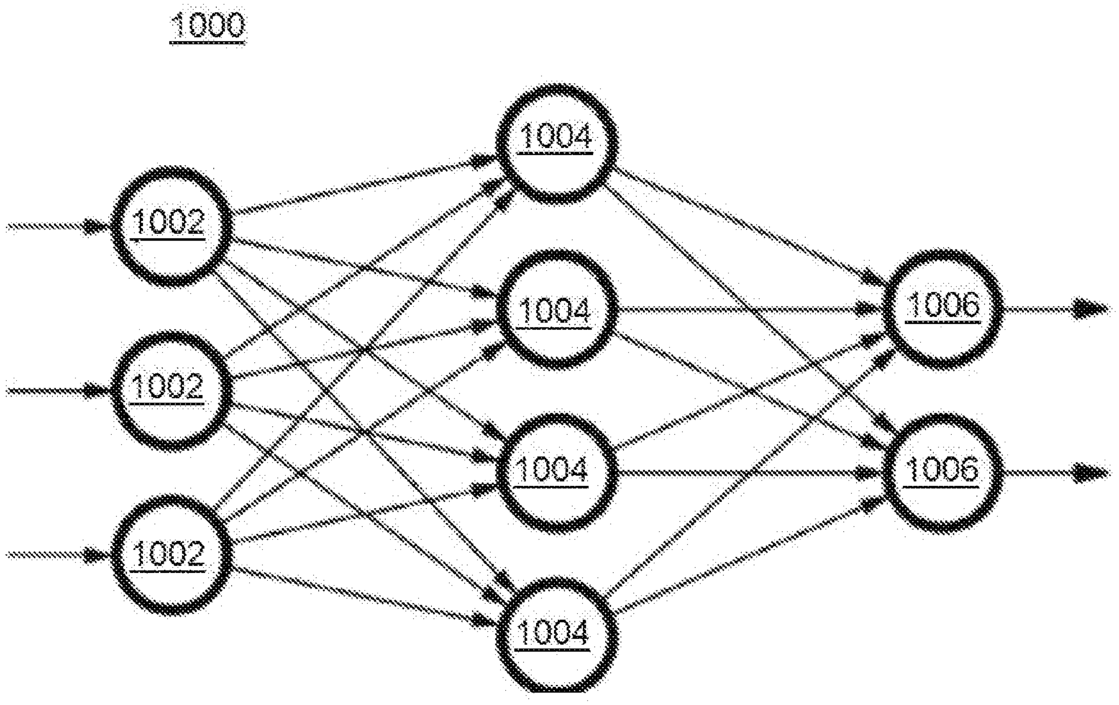
FIG. 4 is a schematic diagram of a neural network formed in "layers", according to an embodiment.

FIG. 4 is a schematic diagram of a neural network 1000 formed in "layers" in which an initial layer is formed by nodes 1002 and a final layer is formed by nodes 1006. Neural network (NN) 1000 may include an intermediate layer formed by nodes 1004. Edges shown between nodes 1002 and 1004 illustrate signal flow from an initial layer to an intermediate layer. Likewise, edges shown between nodes 1004 and 1006 illustrate signal flow from an intermediate layer to a final layer. While neural network 1000 shows a single intermediate layer formed by nodes 1004, it should be understood that other implementations of a neural network may include multiple intermediate layers formed between an initial layer and a final layer.

According to an embodiment, a node 1002, 1004 and/or 1006 may process input signals (e.g., received on one or more incoming edges) to provide output signals (e.g., on one or more outgoing edges) according to operators defined at associated nodes. At a node of neural network 1000, a set of one or more operations associated with the node may map one or more input signals to one or more output signals. In a particular implementation, such a set of one or more operations may be defined based, at least in part, on a weight associated with the node. One class of operators defined at nodes of neural network 1000 may comprise matrix multiplication-like operators such as, for example, convolutions, depth-wise convolutions, matrix multiplies, fully connected, batched matrix multiply and so forth, which may be further defined by associated weights. Another class of operators defined at nodes of neural network 1000 may comprise "activation functions" constructed as unary element-wise operators that introduce a non-linearity. Examples of such activation functions may include, for example, logistic (e.g., sigmoid and/or soft step), hyperbolic tangent, rectified linear unit, Gaussian error linear unit, Softplus, exponential linear unit, scaled exponential linear unit, leaky rectified linear unit, parametric rectified linear unit, sigmoid linear unit, Swish, Mish, Gaussian and/or growing cosine unit functions. Such activation functions may or may not be defined by trainable weights. A parametric rectified linear unit function, in particular, may be defined by a trainable alpha value. Additional element-wise operators defined at nodes of neural network 1000 may include multiply, add, subtract, negate, select and so forth. Nodes in neural network 1000 may also represent layout-like operators, such as Transpose, Reshape, Slice, Concat, Tile, just to provide a few examples.

Additionally, an "input value" as referred to herein means a value provided as an input parameter and/or signal to one or more operators defined and/or represented by a node in a neural network. Likewise, an "output value" as referred to herein means an output value provided by one or more operators defined and/or represented by a node of a neural network. In a particular implementation, an output value may be computed and/or generated according to one or more operators based on and/or responsive to one or more input values received at a node. In a particular implementation, an input value and/or output value may be structured, dimensioned and/or formatted as "tensors". Thus, in this context, an "input tensor" as referred to herein means an expression of one or more input values according to a particular structure, dimension and/or format. Likewise in this context, an "output tensor" as referred to herein means an expression of one or more output values according to a particular structure, dimension and/or format.

According to an embodiment, neural network 1000 may be characterized as having a particular structure or topology based on, for example, a number of layers, number of nodes in each layers, operators implemented at each node, quantization of weights and quantization of input/output tensors. Neural network 1000 may be further characterized by weights to be assigned to nodes to affect operators at respective nodes. During execution, neural network 1000 may be characterized as having a particular state or "intermediate state" determined based on values/signals computed by nodes (e.g., as tensor values to be provided to nodes in a subsequent layer of nodes and/or an output tensor).

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

In particular implementations, intelligent computing devices to perform functions supported by neural networks may comprise a wide variety of stationary and/or mobile devices, such as, for example, automobile sensors, biochip transponders, heart monitoring implants, Internet of things (IoT) devices, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, just to provide a few examples.

According to an embodiment, a neural network may be structured in layers such that a node in a particular neural network layer may receive output signals from one or more nodes in an upstream layer in the neural network, and provide an output signal to one or more nodes in a downstream layer in the neural network. One specific class of layered neural networks may comprise a convolutional neural network (CNN) or space invariant artificial neural networks (SIANN) that enable deep learning. Such CNNs and/or SIANNs may be based, at least in part, on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing (e.g., medical records processing), brain-computer interfaces, financial time series, just to provide a few examples.

Another class of layered neural network may comprise a recursive neural network (RNN) that is a class of neural networks in which connections between nodes form a directed cyclic graph along a temporal sequence. Such a temporal sequence may enable modeling of temporal dynamic behavior. In an implementation, an RNN may employ an internal state (e.g., memory) to process variable length sequences of inputs. This may be applied, for example, to tasks such as unsegmented, connected handwriting recognition or speech recognition, just to provide a few examples. In particular implementations, an RNN may emulate temporal behavior using finite impulse response (FIR) or infinite impulse response (IIR) structures. An RNN may include additional structures to control stored states of such FIR and IIR structures to be aged. Structures to control such stored states may include a network or graph that incorporates time delays and/or has feedback loops, such as in long short-term memory networks (LSTMs) and gated recurrent units.

Figure 5:
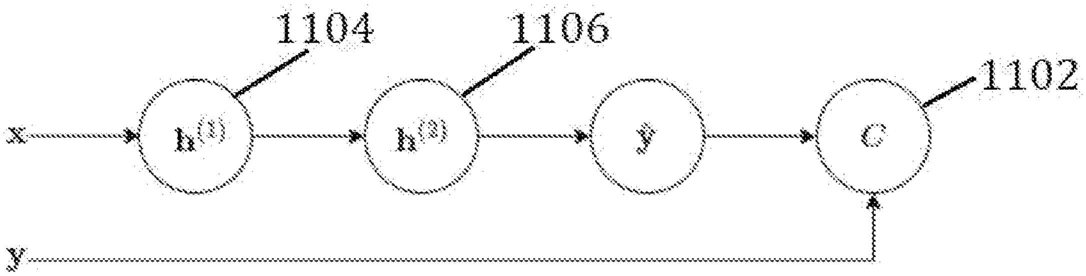
FIG. 5 is a flow diagram of an aspect of a training operation, according to an embodiment.

According to an embodiment, output signals of one or more neural networks (e.g., taken individually or in combination) may at least in part, define a "predictor" to generate prediction values associated with some observable and/or measurable phenomenon and/or state. In an implementation, a neural network may be "trained" to provide a predictor that is capable of generating such prediction values based on input values (e.g., measurements and/or observations) optimized according to a loss function. For example, a training process may employ backpropagation techniques. "Backpropagation," as referred to herein, is to mean a process of fitting parameters of a trained inference model such a model comprising one or more neural networks. In fitting parameters of a neural network, for example, backpropagation is to compute a gradient of a loss function with respect to the weights of the neural network. Based on such a computed gradient of a loss function, weights may be updated so as to minimize and/or reduce such a loss function. In one particular implementation, a gradient descent of a loss function, or variants such as stochastic gradient descent of a loss function, may be used. In training parameters of a neural network, backpropagation may comprise computing a gradient of a loss function with respect to individual weights by the chain rule, computing a gradient one layer at a time, iterating backward from the last layer to avoid redundant calculations of intermediate terms in the chain rule, for example. It should be understood, however, that this is merely an example of how a process of backpropagation may be applied, and claimed subject matter is not limited in this respect. In particular implementations, backpropagation may be used to iteratively update neural network weights to be associated with nodes and/or edges of a neural network based, at least in part on "training sets." Such training sets may include training measurements and/or observations to be supplied as input values that are paired with "ground truth" observations. Based on a comparison of such ground truth observations and associated prediction values generated based on such input values in a training process, weights may be updated according to a loss function using backpropagation. FIG. 5 is a flow diagram of an aspect of a training operation employing backpropagation to train parameters for a feedforward neural network, according to an embodiment. It should be understood, however, that this is merely an example of a type of neural network that may be trained using backpropagation, and that similar backpropagation techniques may be applied to train parameters of other types of neural networks without deviating from claimed subject matter. Training sets may be provided to such a training operation as pairs of vectors (x,y) where x is an input vector and y is a corresponding ground truth label. Input vector x may be provided as an input tensor to a first hidden layer 1104 to produce an output vector $h^{(1)}$, which is provided as an input to a second hidden layer 1106 to provide an output vector $h^{(2)}$. An inference and/or prediction $\hat{y}$ may be computed based, at least in part, on the output vector $h^{(2)}$. A loss function C may be computed at 1102 based, at least in part, on inference and/or prediction $\hat{y}$ and ground truth label y.

In the particular embodiment of FIG. 5, inference and/or prediction $\hat{y}$, and output vectors $h^{(1)}$ and $h^{(2)}$ may be modelled as follows:

$$h^{(1)} = g^{(1)}\left(W^{(1)T}x + b^{(1)}\right)$$

$$h^{(2)} = g^{(2)}\left(W^{(2)T}h^{(1)} + b^{(2)}\right)$$

$$\hat{y}(x) = W^{(3)T}h^{(2)} + b^{(3)},$$

where:

$g^{(i)}$ is an activation function applied at nodes in hidden layer i;

$w^{(i)}$ is a matrix of weights such that weight $$W_{jk}^{(i)}$$

is to be applied at an edge going from node j in layer i−1 to node k in hidden layer i; and $b^{(i)}$ is a bias matrix applied at hidden layer i.

In a particular implementation in which a feedforward neural network includes three or more hidden layers, computation of $\hat{y}(x)$ may be generalized as follows:

$$\hat{y}(x) = W^{(N)T}h^{(N-1)} + b^{(N)}.$$

Loss function $C(y,\hat{y})$ may be computed according to any one of several formulations of a loss function as described above. In a particular implementation, $C(y,\hat{y})$ may be differentiable such that $$\frac{\partial C}{\partial W_{jk}^{(i)}}$$

may be determined using the chain rule and may be computed for any weight $$W_{jk}^{(i)}.$$

According to an embodiment, values for $W^{(i)}$ may be determined iteratively for training sets (x,y) using a gradient descent technique.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:

determining a neural network structure;

observing one or more performance metrics of an execution of the neural network structure by one or more target hardware elements; and selecting a module from a library of modules to replace one or more elements of the neural network structure based, at least in part on the observed one or more performance metrics, wherein the observed one or more performance metrics indicate a load on and/or usage of at least one constrained hardware resource of the one or more target hardware elements, and wherein the selected module reduces the load on and/or usage of the at least one constrained hardware resource.

2. The method of claim 1, wherein:

the neural network structure is represented by a graph comprising operators to communicate according to edges in the graph; and the operators are arranged in layers, wherein the edges represent tensors connecting operators in adjacent layers.

3. The method of claim 2, wherein:

a hardware implementation of at least one of the layers is bound according to the at least one constrained hardware resource; and selecting the module from the library of modules comprises selecting the module to replace at least a portion of the at least one of the layers such that the selected module reduces the load on and/or usage of the at least one constrained hardware resource.

4. The method of claim 3, wherein the at least one constrained hardware resource comprises a particular arithmetic logic unit usage attribute or a memory usage attribute, or a combination thereof.

5. The method of claim 2, wherein selecting the module from the library of modules to replace the one or more elements of the neural network structure further comprises:

sorting the layers according to at least one cost metric; and prioritizing replacement of an element at particular sorted layers according to relative contributions to the at least one cost metric.

6. The method of claim 1, wherein the one or more target hardware elements comprise one or more arithmetic logic units (ALUs) and/or execution units.

7. The method of claim 1, wherein the one or more target hardware elements comprise one or more central processing units (CPUs), one or more neural processing units (NPUs) or one or more graphics processing units (GPUs), or a combination thereof.

8. The method of claim 1, wherein the one or more performance metrics comprise a usage of an arithmetic logic unit (ALU) and/or a level of memory traffic, or a combination thereof.

9. The method of claim 1, wherein:

the one or more elements of the neural network structure to be replaced are isolated to a single layer in the neural network structure; and the selected module is further to reduce the load on and/or usage of the at least one constrained hardware resource by specifying:

affecting sparsity of weights of operators associated with nodes in the neural network structure;

affecting quantization of the weights of operators; or affecting a clustering of the weights of operators, or a combination thereof.

10. The method of claim 1, wherein the one or more elements of the neural network structure to be replaced span multiple connected layers in the neural network structure.

11. The method of claim 1, wherein the one or more elements of the neural network structure to be replaced are isolated to an interface between adjacent layers of the neural network structure.

12. The method of claim 1, wherein the selected module affects a quantization of a feature map and/or activation tensor.

13. The method of claim 11, wherein the selected module is to specify:

skipping at least one edge connection between the adjacent layers;

affecting quantization in an intermediate tensor between the adjacent layers; or affecting operators in at least one of the adjacent layers, or a combination thereof.

14. The method of claim 1, wherein at least one of the one or more performance metrics comprises an execution latency or a memory bandwidth usage, or a combination thereof.

15. A computing device, the computing device comprising:

a memory comprising one or more memory devices; and one or more processors coupled to the memory to:

determine a neural network structure;

obtain one or more observations of one or more performance metrics of an execution of the neural network structure by one or more target hardware elements; and select a module from a library of modules to replace one or more elements of the neural network structure based, at least in part on the obtained one or more observations, wherein the one or more observations indicate a load on and/or usage of at least one constrained hardware resource of the one or more target hardware elements, and wherein the selected module reduces the load on and/or usage of the at least one constrained hardware resource.

16. The computing device of claim 15, wherein the one or more processors are further to:

identify execution passes mapped to a source operation of the one or more target hardware elements; and combine execution cycles for the execution passes to estimate an execution latency of the source operation to obtain at least one of the one or more observations.

17. The computing device of claim 15, wherein the one or more processors are further to:

identify execution passes mapped to a matrix operation, convolution and/or vector operation of the one or more target hardware elements;

for at least one of the execution passes, obtain a count of execution cycles for the matrix operation, convolution operation and/or vector operation; and compare the count of execution cycles with a total number of cycles for the execution of the neural network structure to obtain at least one of the one or more observations.

18. The computing device of claim 17, wherein the selected module is to reduce the load on and/or usage of the at least one constrained hardware resource by a reduction in execution cycles of the matrix operation, convolution operation and/or vector operation based, at least in part, on the comparison of the count of execution cycles with the total number of cycles for the execution of the neural network structure.

19. The computing device of claim 15, wherein the one or more processors are further to:

identify execution passes of one or more hardware elements mapped to a source operation of the neural network structure;

for at least one of the execution passes, compare a number of cycles to transfer a quantity of content with a total number of execution cycles for the source operation; and quantify traffic cycles of the number of traffic cycles as being associated with operator weights to obtain at least one of the one or more observations of the one or more performance metrics of the execution of the neural network structure by the one or more target hardware elements.

20. The computing device of claim 15, wherein the one or more processors are further to:

identify compiled tensors mapped to a source tensor of the one or more target hardware elements; and for at least one of the compiled tensors, determine whether the at least one of the compiled tensors is active during a maximum memory footprint to obtain at least one of the one or more observations.

* * * * *